C. K. LASSITER AND J. KINDERVATER.
RETURN BEND AND METHOD AND APPARATUS FOR MAKING SAME.
APPLICATION FILED NOV. 24, 1920.

1,417,396.

Patented May 23, 1922.

INVENTORS:
C. K. Lassiter & J. Kindervater,
BY
ATTORNEY.

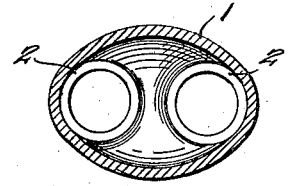
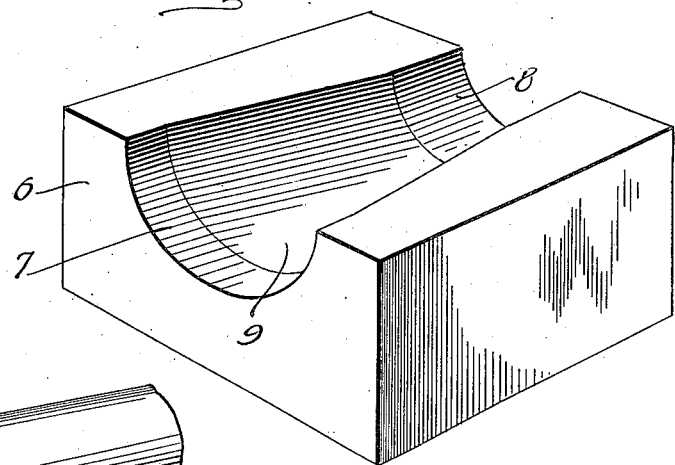
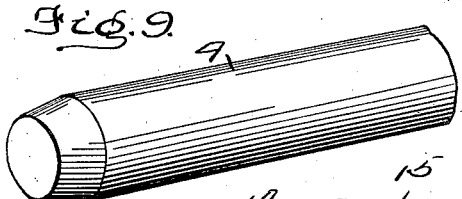
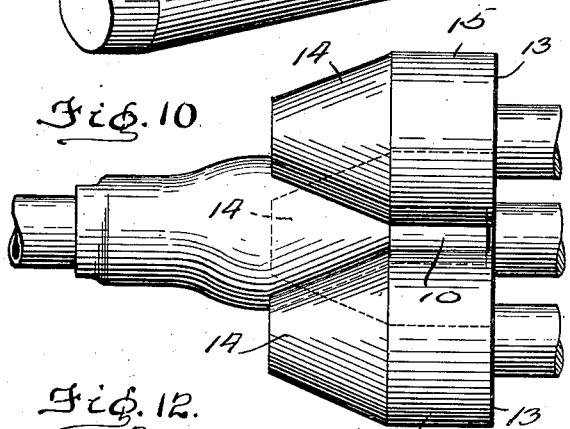
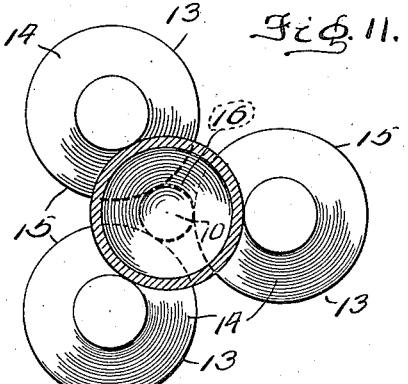
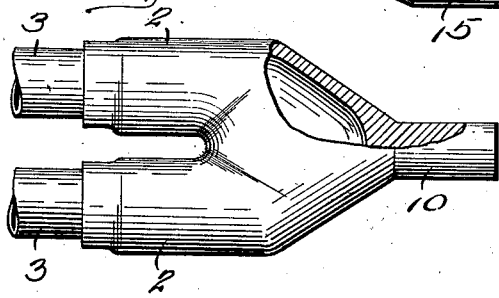
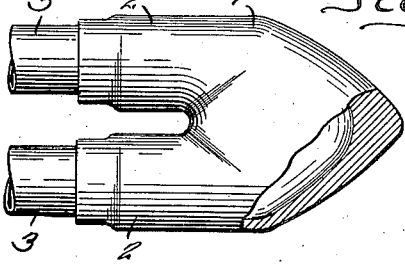

UNITED STATES PATENT OFFICE.

COLUMBUS K. LASSITER AND JULIUS KINDERVATER, OF NEW YORK, N. Y.

RETURN BEND AND METHOD AND APPARATUS FOR MAKING SAME.

1,417,396.   Specification of Letters Patent.   Patented May 23, 1922.

Application filed November 24, 1920. Serial No. 426,249.

*To all whom it may concern:*

Be it known that we, COLUMBUS K. LASSITER and JULIUS KINDERVATER, citizens of the United States, residing at New York, in the county of New York and State of New York, have invented new and useful Improvements in Return Bends and Methods and Apparatus for Making Same, of which the following is a specification.

This invention relates to a method of making return bends, and particularly to a method of making or forming the cap ends of return bends of the type shown in our application executed of even date herewith, filed Nov. 24, 1920, Serial No. 426,246, in which the return bend is constructed as a distinct unit or article of manufacture from the pipes or tubes which are to be joined thereto by welding or in some other suitable manner, as contradistinguished from that type of return bends in which the end portions of the tubes to be joined are themselves fashioned into such a return bend whereby the tubes and bend are integrally joined, although certain steps of the method herein disclosed no doubt may be advantageously used in the production of return bends of the latter-named type.

In our application, Serial No. 426,246, above referred to, we have disclosed a method of making the leg-end of a breeches-type of return bend from a piece of circular tubing of suitable length. By this method is produced a return bend the opposite or cap end of which is left open for further treatment. The present invention starts with the incomplete return bend as made by the method of our said application Serial No. 426,246 and provides a novel method of forming or closing and welding the cap end of the bend.

The object of the present invention is to provide a method of shaping and welding the cap end of a return bend of the type set forth in a convenient, inexpensive and highly satisfactory manner.

A further object of the invention is to provide a method of forming the cap end of a bend by a spinning, i. e., rolling-down, shaping and welding action, whereby a strong and durable construction of cap end will be produced.

A still further object of the invention is to provide a method whereby the number of operations and number of welds required to form the cap end may be reduced with material advantages, and whereby the area of the cross passage and thickness of the end wall of the bend may be governed and controlled to an exact degree.

The invention will be readily understood by reference to the following description and accompanying drawings, in which drawings:—

Figure 7 is a cross section on line 7—7 of Figure 5.

Figure 8 is a view of one of the swaging dies.

Figure 9 is a view of the mandrel used in connection therewith.

Figure 10 is a side view of the closing and welding devices, illustrating the closing and welding action.

Figure 11 is an end view thereof.

Figure 12 is a view of the bend as it appears just prior to completion.

Figure 13 is a view of the completed bend, partly in section.

Figure 1:
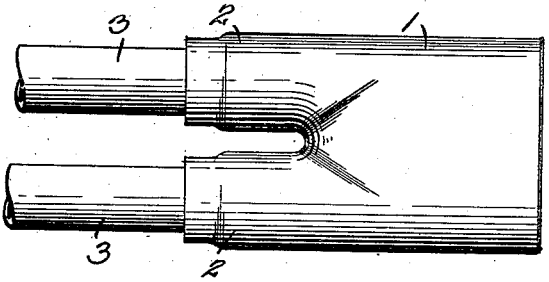
Figure 1 represents an incomplete return bend as it appears preparatory to the formation of the cap end thereof by the present method.
Figure 2:
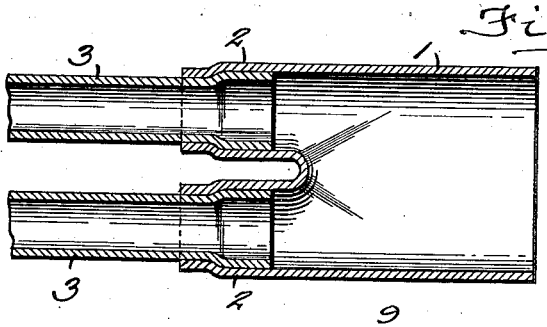
Figure 2 is a longitudinal section taken axially through the bend and tubes.
Figure 3:
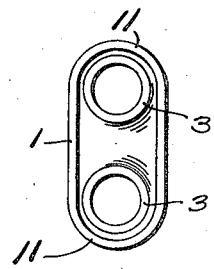
Figure 3 is an end view of the same.

The incomplete bend illustrated in Figures 1, 2 and 3 is shown as comprising a body 1 formed at one end to provide parallel legs, tubular projections or sockets 2 to which the ends of the pipes or tubes 3 are welded or otherwise suitably secured. In the operation of forming the leg-end of the bend, just described, the body 1, which is initially a short piece of circular tubing, is flattened to a substantially elliptical form in cross section. This method of manufacture produces a bend which is open at the opposite or cap end, and must be completed by the closure of the cap end, and is further distinguished and characterized in the fact that the metal of the body, and of which the cap end is to be made, is a continuous and homogeneous part of the original tube, i. e., has not been formed from separate tubes by slitting and welding.

Figure 4:
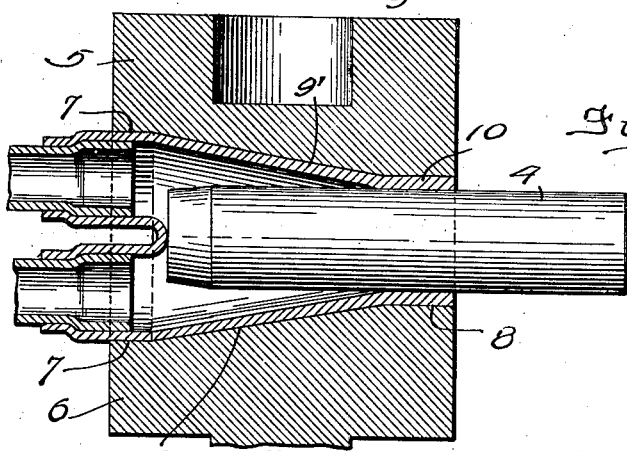
Figure 4 is a section, similar to Figure 2, taken through the bend and dies, and showing the first step of the cap forming method.
Figure 5:
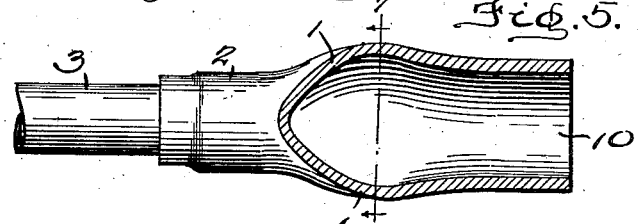
Figure 5 is a longitudinal section through the bend, taken at right angles to the plane of section shown in Figure 4, showing the bend as it appears after such first step of treatment.
Figure 6:
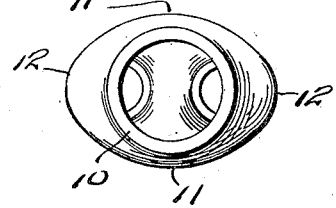
Figure 6 is an end elevation of the same.

In carrying out our method for closing the cap end of the bend, the first step is the heating of the bend and its gradual contraction to effect the partial closing of its open end for the subsequent final shaping and welding action. In this operation we employ an arbor or mandrel 4 and a pair of symmetrical dies 5 and 6, whose acting surfaces are of counterpart formation and of the shape it is desired to give the end of the return bend. As illustrated by the construction exemplified in Figures 4 and 8, the die members have active faces formed to provide a shaping cavity having opposite circular or other properly shaped end portions 7 and 8, the former of materially greater diameter than the latter, and an intermediate tapering or conical portion 9. The bend, after being previously heated, as stated, is placed between the dies and the mandrel 4 inserted into the open end of the bend, and the said open end of the bend then swaged by blows from a power hammer or other suitable means well known in the art until it assumes the form shown in Figures 4, 5 and 6. It will be evident that as a result of this mode of treatment the elliptical or substantially elliptical open end of the bend will be reduced to a shape in which it tapers, as shown at 9', toward its open end and terminates in a reduced circular or cylindrical terminal 10.

In the swaging action the pressure is produced upon the walls 11 in a plane parallel with the major axis of the elliptical body shown in Figures 1, 2 and 3, which according to conditions may or may not result in a greater or less bulging out of the walls 12 of said body. These walls 12 may, at any subsequent stage, be flattened out to any certain degree, if necessary or so desired.

The next step of the method consists in the further contraction and closing and welding of the open end of the return bend to complete the formation of the cap. In such operation a working group or series of, preferably three, equidistantly arranged swaging and welding rollers 13 is employed. Each of these rollers has an outer tapered or frusto-conical portion 14 and an inner cylindrical portion 15, and said rollers are arranged about and in equidistant relation to an intervening unobstructed central guide throat or passage 16 designed to receive the cylindrical terminal 10. The rollers 13 are suitably mounted to revolve upon their axes and in practice are radially adjustable toward and from said throat or central passage, and in the rolling-down action the tapered portions 14 of the rollers are designed to act upon the tapered portion 9' of the bend while the cylindrical portions 15 of the rollers are designed to act upon the cylindrical terminal 10 of the bend. The bend being raised to a welding heat, it is then moved forward toward and into the throat between the rollers, and as it enters farther and farther and as the rollers are gradually moved inward or brought closer together by suitable means under control of the operator, the portion 9' will be further tapered down to a final or finished taper while the outer end of the bend will be swaged down until it is closed and welded and the cylindrical terminal 10 reduced to a solid stem or projection 10', resulting in the production of a closed bend of the form shown in Figure 12. In this operation, the unobstructed guide throat or passage 16 permits the excess metal, beyond that required for a thin closure wall, and which results from the narrowing down of the bend, to flow longitudinally beyond the point of closure, which is of advantage in allowing the bend to be shaped to the exact form of taper, as well as to allow a portion of such metal to be used in the thickening of the closure wall to a desired degree, the remainder of the metal extending in the form of the solid excrescence or projection 10'. The solid projection 10' is then sheared off or removed in any suitable manner, thereby fully completing the operation and producing the bend shown in Figure 13. While the above description premises a feed movement of the bend toward the rollers, it is, of course, obvious that the reverse may be the case and the same result obtained, and we therefore do not limit the invention in this particular. The feed motion may be carried out either by hand or power.

As a result of the method above described, a bend having a closed or cap end is produced which is of superior strength and durability, because the swaging and welding devices act upon a continuously homogeneous body of metal, which has not been previously slit or welded, and which is formed and closed completely by a single weld of greater strength and uniformity because of the rolling action and also because of the absence of previous welds. Also by the operation of swaging and welding by the rolling-down action, the thickness of the tip of the end wall may be regulated or varied as desired or to suit any special requirement and the closing and welding action controlled to a nicety to provide a cross channel of the exact cross-sectional area required. A rapid and inexpensive formation of the cap end is also ensured, without excessive care or skill on the part of the operator, since accurate centering of the bend between the rollers is ensured by the presence of the cylindrical terminal 10 and the form and arrangement of the rollers 13.

Having thus fully described our invention, we claim:

1. The method of forming the cap end of a return bend, which consists in reducing the bend from a cross-sectionally elliptical form to a form in which it tapers toward its open end and terminates at such end in a substantially circular constricted portion, and then spinning down the walls of the tapered portion of the bend by rolling compression on lines converging in the direction of the open end until such walls at such end merge and are solidly welded together.

2. The method of forming the cap end of a return bend, which consists in shaping the bend so that it tapers toward its open end, and then passing the tapered portion of the bend between spinning rolls having tapered surfaces, and causing said tapered roll surfaces to spin down the walls of the open end of the bend until such end is closed and welded.

3. The method of forming the cap end of an incomplete return bend of the character described, which consists in shaping the bend so as to form a tapering portion with a cylindrical terminal, closing and welding such tapering portion and reducing such cylindrical terminal to a solid stem by a rolling-down action, and then removing the solid stem.

4. The method of forming the cap end of a return bend, which consists in reducing the body of the bend from a cross-sectionally elliptical form to a form in which it tapers generally to a substantially circular form at its open end, disposing the open end of the bend between a working group of spinning rolls having tapered surfaces, and causing said tapered surfaces of the rolls in the presence of welding heat to spin down the open end of the bend to a closed and welded condition.

5. The method of forming the cap end of an incomplete return bend of the character described, which consists in shaping said open end for admission to an unobstructed throat or passage between a working group of swaging and welding rolls having tapered acting surfaces, and then by the action of said surfaces closing and welding such end, while permitting the metal to flow longitudinally under compression of said surfaces in said throat or passage.

6. The method of forming the cap end of an incomplete return bend of the character described, which consists in shaping such end so as to form a tapering body having a cylindrical terminal, subjecting the same to the action of rollers having corresponding surfaces to close and weld said tapering body and compress the cylindrical terminal to a solid stem, and then removing such solid stem.

7. The method of forming the cap end of a return bend, which consists in swaging down the body of the bend so that it tapers longitudinally to progressively reduced cross-sectional dimensions toward its open end, heating such tapered portion of the bend to welding heat, and then spinning down the tapered portion of the bend to an increased tapering reduction until its open end is closed and welded.

8. The method of forming the cap end of a return bend, which consists in reducing the bend body between its crotch portion and open end from a primarily elliptical form to a form in which it tapers longitudinally toward such end, and then spinning down the tapered portion of the body on converging lines to an increased tapering reduction until its open end is closed and welded.

9. The process of forming the cap end of a return bend, which consists in shaping the primarily elliptical bend body so that it tapers substantially from its crotch portion to its open end and terminates at such end in a cylindrical projection, heating the tapered portion and said cylindrical projection to welding heat, and spinning down the tapered portion while simultaneously constricting and solidifying the cylindrical projection until the open end is closed and welded.

10. The method of forming the cap end of an incomplete bend, which consists in shaping the bend body so that its diameter gradually decreases toward its open end, and then, in the presence of welding heat, subjecting the shaped portion of the bend to a spinning down action by the rolling compression of tapering surfaces so as to cause its walls to approach on converging lines and thereby close and weld its open end while causing all excess metal to flow longitudinally in the form of an excrescence beyond the point of closure, and then removing such excrescence.

11. The method of forming the cap end of an incomplete bend, which consists in shaping the bend body so that its diameter gradually decreases toward its open end, and then, in the presence of welding heat, subjecting the shaped portion of the bend to a spinning down action by the rolling compression of tapered surfaces so as to cause its walls to approach on converging lines and thereby close and weld its open end while causing all excess metal to flow longitudinally beyond the point of closure.

12. The method of forming the cap end of an incomplete return bend, which consists in varying the form of the bend from an elliptical cross-section to a form in which it tapers longitudinally from its leg end to a reduced portion of substantially cylindrical cross-section at its open end, and spinning down the tapered portion of the bend under welding heat between rollers which bodily compress the walls of the tapered portion inwardly on converging lines conforming to its taper until the walls at the tip of such tapered portion merge and are solidly welded together.

13. The process of forming the cap end of a return bend, which consists in swaging down the elliptical body of the bend between dies shaped to form said bend with a tapering portion having a cylindrical terminal, heating the shaped portion of the bend to welding heat, and spinning down the shaped and heated portion of the bend between rollers having cylindrical inner end surfaces and tapered outer end surfaces to respectively compress said cylindrical terminal and adjacent portions of the walls of the tapered portion to a closed and solid condition.

14. The method of forming the cap end of a return bend, which consists in tapering the bend toward its open end, heating the tapered portion of the bend to welding heat, inserting the tapered end of the bend between an annular group of spinning rolls having tapered surfaces, establishing a relative feed motion between the bend and group of rolls on a line parallel with their axes, and moving the rolls radially toward the bend for a compressing action thereon.

15. That step in the art of closing and welding the open end of an incomplete return bend, which consists in spinning down by rolling compression the suitably shaped and partially closed end of the bend to a completely closed and welded condition in the presence of welding heat while permitting the metal to flow longitudinally under such rolling compression in the direction of and to a point beyond the point of welding closure.

16. In means for shaping an incomplete bend preparatory to closing the open end thereof, a die comprising two counterpart members having opposed shaping surfaces formed to provide a cavity having a circular end portion of major diameter, a circular end portion of minor diameter, and an intermediate portion tapering uniformly from said circular end portion of major diameter toward said circular end portion of minor diameter.

17. In means for shaping an incomplete bend preparatory to and as part of an operation of closing the open end thereof, the combination of a die comprising two counterpart members having opposed shaping surfaces formed to provide a cavity having a circular end portion of major diameter, a circular end portion of minor diameter, and an intermediate portion tapering uniformly from said circular end portion of major diameter toward said circular end portion of minor diameter; and a mandrel adapted to be inserted into said die cavity through said circular end portion of minor diameter, said mandrel having a cylindrical shaping surface of less diameter than said circular end portion of minor diameter for cooperation therewith.

18. In means for use in the art of closing the open ends of return bends, an annular series of swaging and welding rolls grouped about a common axis forming an open throat or passage between said rolls, said rolls having frusto-conical outer end portions and circular inner end portions to act upon substantially correspondingly-shaped surfaces of a return bend inserted in said throat, both the said frusto-conical end portions and the said circular end portions of the rolls being exposed in the said throat or passage for working operation against the said surfaces of a bend under treatment.

19. The method of making a return bend, which consists in first forming the leg-end of the bend from a piece of tubular stock, swaging and partially closing the opposite end of the stock, and then closing and welding such partially closed end of the stock by roller compression.

20. That step in the art of closing and welding the open end of an incomplete return bend, which consists in subjecting the same, while the portion of the metal treated is free to flow longitudinally, to rolling compression.

21. A return bend having a tapered roll-closed-and-welded cap end.

22. A return bend formed from a single piece of tubular stock and having a leg-end and a tapered roll-compressed-and-welded cap end.

In testimony whereof we affix our signatures.

COLUMBUS K. LASSITER.
JULIUS KINDERVATER.